United States Patent [19]

Miyashita et al.

[11] 4,347,536
[45] Aug. 31, 1982

[54] ROTARY CYLINDER APPARATUS

[75] Inventors: Kunio Miyashita; Tadashi Takahashi; Shigeki Morinaga, all of Hitachi, Japan

[73] Assignee: Hitachi, Ltd., Tokyo, Japan

[21] Appl. No.: 109,499

[22] Filed: Jan. 4, 1980

[30] Foreign Application Priority Data

Jan. 10, 1979 [JP] Japan .................................. 54-687
Jan. 26, 1979 [JP] Japan ................................. 54-7177

[51] Int. Cl.³ ............................................. G11B 5/52
[52] U.S. Cl. .................................... 360/107; 360/84; 360/130.22
[58] Field of Search ............... 360/107, 84, 128-130, 360/130.22-130.24, 109; 310/268, 181

[56] References Cited

U.S. PATENT DOCUMENTS 4,072,874  2/1978  Arnold, Jr. ......................... 310/268
4,117,519  9/1978  Shioyama et al. ..................... 360/84

Primary Examiner—John H. Wolff
Attorney, Agent, or Firm—Craig and Antonelli

[57] ABSTRACT

A rotary cylinder apparatus comprises a rotary drum mounted thereon with a magnetic head, a brushless motor for driving the rotary drum, a stationary drum housing the brushless motor and which is disposed opposing the rotary drum, and a revolution-rate detector for detecting the number of revolutions of the rotary drum. The brushless motor comprises a permanent magnet rotor connected to the rotary drum, a driving coil mounted on the stationary drum, and a position detector for detecting the position of the permanent magnet rotor in order to control current to be supplied to the driving coil. The detecting coil of the revolution-rate detector and the brushless motor are housed in the stationary drum and wiring of the driving coil and revolution-rate detecting coil is performed on a common wiring board. Thus, the driving section of the rotary cylinder apparatus is small-sized and made light in weight, and the number of processes of assembling the rotary cylinder apparatus can be decreased.

13 Claims, 5 Drawing Figures

U.S. Patent     Aug. 31, 1982     4,347,536
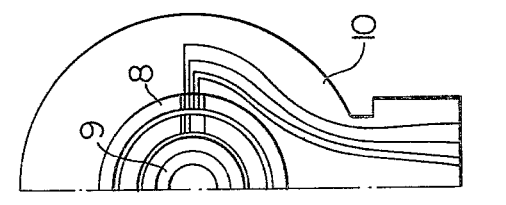
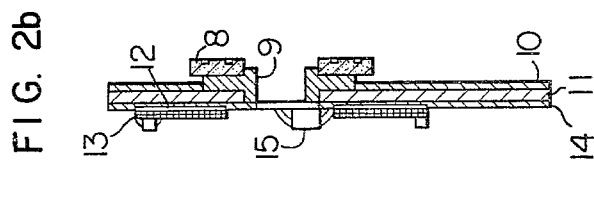
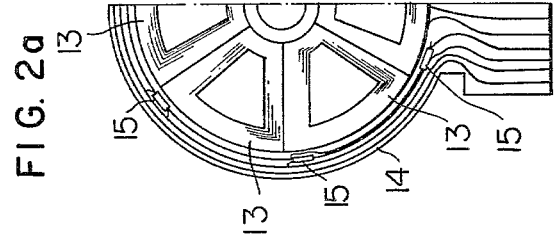
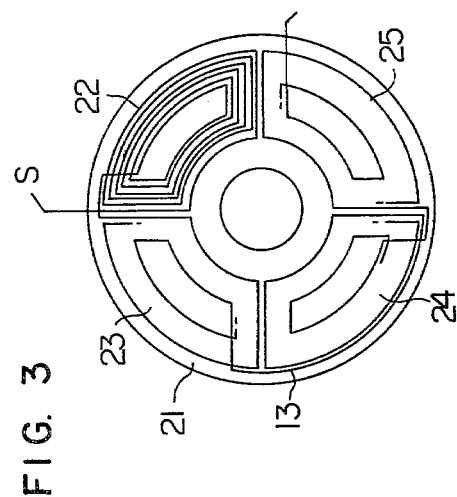
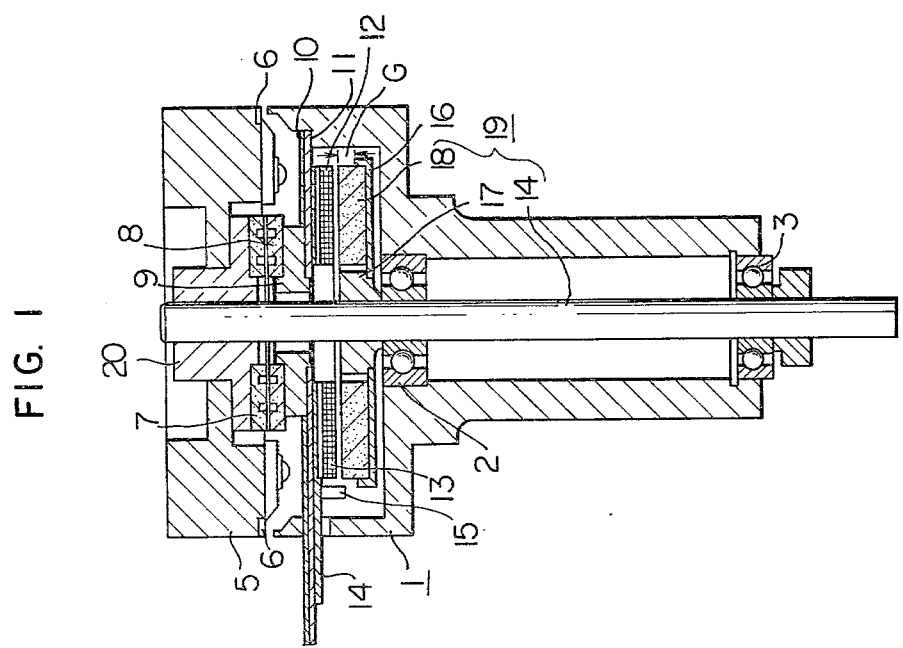

4,347,536

ROTARY CYLINDER APPARATUS

BACKGROUND OF THE INVENTION

1. Field of the Invention

The present invention relates to rotary cylinder apparatus of a video tape recorder (VTR) by which a video signal is recorded on or reproduced from a magnetic tape, and particularly to a driving motor of rotary cylinder apparatus.

2. Description of the Prior Art

As is well known, the rotary magnetic head VTR is designed to record or reproduce signals onto or from a magnetic tape by high-speed rotation of the magnetic heads and, in order to reproduce or record clear and stable video images, the rotary magnetic heads must be very smoothly rotated at quite constant speed.

Recently, there have been proposed rotary cylinder apparatus of the direct-drive type in which the rotary shaft of the motor is directly connected to the magnetic heads and the motor used is a brushless motor with long life and less vibration.

This type of rotary cylinder apparatus, is disclosed in, for example, U.S. Pat. No. 4,117,519 and comprises a rotary drum having mounted thereon two rotary heads and a primary rotary transformer directly connected to the heads, with a stationary drum opposing the rotary drum and on the top of which there is mounted a secondary rotary transformer through a first wiring board.

The brushless motor for driving the rotary drum is placed at the lower portion of the stationary drum under the first wiring board, and the motor mainly comprises a stator yoke of a magnetic material fixedly attached to the first wiring board, a driving coil mounted on the stator, and a permanent magnet rotor opposed to the driving coil through a small gap in the axial direction. A detector section for operation of the brushless motor comprises a position detector having a position detecting rotor disposed at the lower portion of the permanent magnet rotor, a position detecting stator mounted on the stationary drum to oppose the position detecting rotor, a second wiring board for wiring lead wires from the position detecting stator, and a revolution-rate detector having a revolution-rate detecting coil mounted in a housing which is secured to the lower end of the stationary drum, a permanent magnet for magnetic excitation, and stator teeth supported to oppose a rotor teeth mounted on the shaft.

The conventional apparatus of such construction can be small-sized and made light in weight as compared with the belt-drive type because the shaft of the motor is directly connected to that of the rotary drum.

However, the driving coil and position detecting stator, as main parts of the motor, require first and second wiring board, and it is also necessary to separately produce the stationary drum and the housing and to fixedly connect together by bolts or the like because the revolution-rate detecting coil is mounted within the housing at the lower end of the stationary drum. Therefore, it is difficult for the conventional apparatus to be small-sized.

Moreover, the revolution-rate detector is a generator or tachometer comprising rotor teeth formed in a gear-like shape on the outer periphery of the exciting permanent magnet which is fixed to the rotating shaft, stator teeth opposing to the rotor teeth and a revolution-rate detecting coil supported by a magnetic member, whereby the change of permeance upon rotation of the rotor teeth is detected by the revolution-rate detecting coil.

This generator requires a great number of teeth because of the need for high precision, and thus the rotor teeth and stator teeth become too large to be incorporated in the interior of the motor. Therefore, the requirements for small size and high precision, which are incompatible with each other, can not be fully satisfied.

Morever, the assembly of such apparatus takes much time because parts to be assembled must be disposed at several different places and the mounting of parts on chassis or the like also takes much time and labor.

SUMMARY OF THE INVENTION

Accordingly, it is an object of the present invention to provide a rotary cylinder apparatus capable of obviating the defects in the conventional apparatus, making the driving portion of the rotary cylinder small-sized and light in weight, and reducing the assembling time.

Another object of the present invention is to provide a brushless motor with a small-sized rotation-rate detector incorporated therein.

The rotary cylinder apparatus according to the present invention comprises a rotary drum provided with magnetic heads, a brushless motor for driving the rotary drum, a stationary drum, having the brushless motor housed therein and being disposed opposite the rotary drum, and a revolution-rate detecting means for detecting the number of revolutions of the rotary drum. The brushless motor comprises a permanent magnet rotor connected to the rotary drum, a driving coil mounted on the stationary drum to oppose the permanent magnet rotor through a predetermined gap, and a position detecting means for detecting the position of the permanant magnet rotor in order to control current to be supplied to the driving coil. The detecting coil of the rotation-rate detecting means is disposed to oppose the permanent magnet rotor together with the driving coil, and the magnetic flux from the permanent magnet rotor is used to induce in the detecting coil a speed signal corresponding to the number of revolutions of the rotary drum.

BRIEF DESCRIPTION OF THE DRAWINGS

FIG. 1 is a longitudinal cross-sectional view of an embodiment of the rotary cylinder according to the present invention;

FIG. 2a is a front view of a part of a stator yoke portion of the rotary cylinder of the present invention;

FIG. 2b is a cross-sectional view of the stator yoke portion of FIG. 2a;

FIG. 2c is a bottom view of the part of the stator yoke portion of FIG. 2a; and

FIG. 3 is a plan view of an example of the driving coil according to the present invention.

DESCRIPTION OF THE PREFERRED EMBODIMENT

Referring to FIG. 1, there is shown a stepped cylinder-shape stationary drum 1 by which a shaft 4 is rotatably supported through upper and lower bearings 2 and 3 provided on the inner periphery of a small-diameter portion 1A of the drum 1.

The top end of the shaft 4 is secured by a mounting boss 20 to a rotary drum 5. The rotary drums 5 has an outer diameter equal to that of the large-diameter portion 1B of the stationary drum 1. To the outer periphery of the rotary drum 5 close to the stationary drum 1 there are secured two magnetic heads 6 which are used for recording or reproducing video signals.

A rotary transformer 7, for transmitting video signals, is secured through the mounting boss 20 to the bottom surface of the rotary drum 5 opposing the stationary drum 1. A stationary transformer 8 is provided to oppose the rotary transformer 7. This stationary transformer 8 is fixed to a stator yoke 11 through a boss 9 and a printed circuit board 10. This stator yoke 11 is secured to the opening end of the large-diameter portion 1B of the stationary drum 1.

The printed circuit board 10 is used to deal with the terminal of the stationary transformer 8 and video signals from the magnetic heads 6 are derived through the printed circuit board 10.

In other words, the video signals from the magnetic heads 6 are transmitted to the rotary transformer 7, from which the video signals are transferred to the stationary transformer 8 which is opposed to the rotary transformer 7 with a small gap therebetween. Then, the video signals are transmitted through the printed circuit board 10 to the external circuits.

To the bottom surface of the stator yoke 11, or the opposite surface thereof to the surface to which the printed circuit board 10 is attached there is secured a revolution-rate detecting coil 12 and a driving coil 13 through a printed circuit board 14. As shown in FIG. 2a, magnetosensitive elements 15 for detecting the position of the rotor, (for example, Hall elements) are secured on the printed wiring board 14 at positions close to the outer periphery of each coil 12, 13.

The printed wiring board 14 is secured to the stator yoke 11 and used to connect the leads from the revolution-rate detecting coil 12, the driving coil 13 and the magnetosensitive elements 15.

A permanent magnet 18, secured to the shaft 4 through a rotor yoke 16 and a boss 17, is located to oppose the driving coil 13 with a small gap therebetween. The permanent magnet 18, the boss 17, the rotor yoke 16 and the shaft 4 constitute a rotor 19 of the brushless motor.

With this construction, when a predetermined drive voltage is supplied to the driving coil 13, the rotor 19 is rotated by the electromagnetic force between the driving coil 13 and the permanent magnet 18, thereby rotating the magnetic heads 6 through the shaft 4 and the rotary drum 5. Thus, the magnetic heads 6 scan a video tape (not shown) passing around the outer periphery of the rotary drum 5 at which time a predetermined signal is recorded on or reproduced from the video tape. This signal, upon reproduction, is transmitted to the external circuits through the rotary transformer 7, the stationary transformer 8 and the printed circuit board 10.

On the other hand, since the magnetic flux emerging from the permanent magnet 18 interlinks with the driving coil 13 and the revolution-rate detecting coil 12 as the magnet 18 rotates, the detecting coil 12 has induced therein a signal the magnitude and frequency of which are both proportional to the rotational speed of the permanent magnet 18, or the rotor 19.

Therefore, either the magnitude or frequency of the induced voltage in the detecting coil 12 is derived as a signal through the printed circuit board 14 and is used to detect the rotational speed of the rotor 19. The detected rotational speed signals controls the driving signal to be supplied to the driving coil 13.

Moreover, although the rotor yoke 16 supporting the permanent magnet 18 covers the outer periphery of the permanent magnet 18, part of the permanent magnet 18 on the side close to the driving coil 13, as indicated by a length G, (FIG. 1) is exposed to the air. Therefore, the magnetosensitive elements 15 mounted on the printed wiring board 14 are able to sense the leakage magnetic flux from the permanent magnet 18 to thereby detect the position of the magnet 18.

The signal resulting from the detection of the position of the rotor 19 by the magnetosensitive elements 15 is thus used to generate a current corresponding to the position of the permanent magnet 18 and this current is supplied to the driving coil 13 for driving of the brushless motor.

According to the embodiment of the present invention the magnetomotive force of the permanent magnet 18 forming the rotor 19 is used for the detection of the number of revolutions (or rotational speed) with the aid of only the detecting coil 12, which can be small-sized in construction and housed in the stationary drum 1. Moreover, since the detecting coil 12 is disposed close to the stator yoke 11 remote from the permanent magnet 18, and the driving coil 13 close to the permanent magnet 18, the driving coil 13 can be operated where there is much more effective flux from the permanent magnet 18, thus preventing any reduction in the motor performance. The stator yoke 11, interposed between the printed wiring boards 10 and 14, serves to shield the stationary transformer 8 from noise due to the current flowing through the driving coil 13 and thus negligibly small noise is transmitted into the transformer 8. Furthermore, if the driving coil 13 and the revolution-rate detecting coil 12 are integrated by bonding, only the printed wiring board 14 is able to treat, with the leads from the driving coil 13, the detecting coil 12 and the magnetosensitive elements 15, thereby eliminating any need for an additional printed wiring board for the detecting coil 12, which is effective to simplify the apparatus.

FIG. 3 shows one example of the shape of the driving coil 13 used in the invention. This driving coil 13 is wound opposing to the four poles, alternate N and S poles at right angles, of the permanent magnet 18. The number of poles may be four or any number, and thus the case of four poles, as an example, will be described with reference to FIG. 3. The driving coil 13 is formed by four coils 22 to 25 wound on an insulating sheet 21. The coil 22 is spirally wound clockwise on a outermost periphery of the coil 22 from the beginning S, and a return wire of each turn is passed through that turn to the beginning of the next turn as illustrated. After completion of a predetermined number of turns, of coil 22, the next coil 23 is continuously spirally wound counter-clockwise on the outermost periphery until there is a predetermined number of turns. Then, the next coil 24 is continuously wound clockwise in the same way, followed by the coil 25 which is wound counter-clockwise, thus completing a sheet of the driving coil 13.

The actually used driving coil 13 is formed by a necessary number of such sheets piled, or superposed on each other. In the two-phase motor, the phase of each coil is shifted by $\pi/2$, while in the three-phase motor the phase is shifted $2\pi/3$ and three sheets of the coil 13 are piled, or superposed.

Moreover, the revolution-rate detecting coil 12 can be formed by a single sheet of the same coil as the driving coil 13 as shown in FIG. 3.

Thus, if the detecting coil 12 is wound in the same way as that of the driving coil 13 and the number of coils which form a sheet of the detecting coil 12 equals to that of the poles of the permanent magnet 18, the output from the detecting coil 12 is obtained as the average on the four poles of the permanent magnet 18. Therefore, the output vibration due to irregular magnetization of the magnet, if present, can be removed by the averaging action.

Moreover, if the detecting coil 12 is formed in quite the same shape as that of the driving coil 13, both the coils 12 and 13 can be produced at the same time without the necessity of preparing special parts for detecting the number of revolutions, which fact leads to mass-producibility, easy processing and low cost.

At this time, if the wire diameter and material of the detecting coil 12 are selected to be the same as those of the driving coil 13, the capability of mass-production can be further increased.

Moreover, superposition of the detecting coil 12 and the driving coil 13 with phase properly shifted will reduce the effect of induced current from the driving coil 13. On the other hand, the induction from the driving coil 13 to the detecting coil 12 causes no trouble, thus the driving coil 13 and the detecting coil 12 can be superposed in phase for the purpose of easy production. In this case, the detecting coil 12 and the driving coil 13 can automatically be wound simultaneously on the single insulating sheet 21 by using a pair of conductors, thus further increasing the mass-producibility.

The driving coil 13 is not limited to the shape described in the above example, but may take other possible shapes or constructions. For example, as shown in FIG. 2a, six coils can also be arranged at equal intervals for eight poles of the permanent magnet 18, and the eight sides may be arranged in approximately a cross pattern on the insulating sheet.

According to the present invention as described above, all the elements of the drive section of the rotary cylinder apparatus are housed in the stationary drum 1 and wiring of the driving coil 13 and revolution-rate detecting coil 12 is performed on a common wiring board, so that the rotary cylinder apparatus can be small-sized and made light in weight and the number of processes of assembling the rotary cylinder apparatus can be decreased.

While a particular embodiment of the invention has been shown and described, it will be obvious to those skilled in the art that changes and modifications may be made without departing from the invention in its broader aspects and, therefore, the appended claims are intended to cover all such changes and modifications as fall within the true spirit and scope of the invention.

We claim:

1. A rotary cylinder apparatus comprising:
   a rotary drum having a magnetic head mounted thereon;
   a brushless motor for driving said rotary drum;
   a stationary drum disposed opposite to said rotary drum for housing said brushless motor;
   rotational speed detecting means including a detecting coil for detecting the rate of rotation of said brushless motor;
   said brushless motor including a shaft connected to said rotary drum, a rotary yoke mounted on said shaft, a multiple permanent magnet rotor supported by said rotary yoke, a stator yoke mounted on a portion of said stationary drum, and a driving coil mounted on said stator yoke opposite to said permanent magnet rotor with a predetermined gap being provided between the driving coil and the stator yoke; and
   position detecting means mounted adjacent said driving coil of said brushless motor for detecting the position of said permanent magnet rotor to control the current supplied to said driving coil;
   said detecting coil of said rotational speed detecting means being laminated with said driving coil between said stator yoke and said permanent magnet rotor and being disposed in a cross relationship with magnetic flux of said permanent magnet rotor for generating signals representing the rotational speed of said brushless motor.

2. A rotary cylinder apparatus according to claim 1, wherein said detecting coil of said rotational speed detecting means is disposed between said stator yoke and said driving coil of said brushless motor.

3. A rotary cylinder apparatus according to claims 1 or 2, wherein said detecting coil of said rotational speed detecting means has internal and external diameters which are the same as the internal and external diameters of said driving coil of said brushless motor, and said detecting coil is disposed coaxially with respect to said driving coil.

4. A rotary cylinder apparatus according to claim 3, wherein said stator yoke, detecting coil and driving coil all have a flat shape.

5. A rotary cylinder apparatus according to claims 1 or 2, further including a printed circuit board mounted on said stator yoke facing said permanent magnet rotor, and wherein said detecting coil of said rotational speed detecting means is mounted on said printed circuit board and said driving coil of said brushless motor is mounted on said detecting coil.

6. A rotary cylinder apparatus according to claim 1, wherein at least a portion of said stationary drum has the same diameter as said rotary drum and is disposed coaxially therewith.

7. A rotary cylinder apparatus comprising:
   a rotary drum having a magnetic head mounted thereon;
   a stationary drum disposed coaxially with respect to said rotary drum and having an internal space for housing a motor for driving said rotary drum;
   a brushless motor disposed within said stationary drum, including a shaft connected to said rotary drum, a rotary yoke mounted on said shaft, a multiple permanent magnet rotor supported by said rotary yoke, a stator yoke secured to said stationary drum, and a driving coil mounted on said stator yoke opposite to said permanent magnet rotor with a predetermined gap being provided between the driving coil and the stator yoke; and
   rotational speed detecting means including a detecting coil disposed between said stator yoke and said driving coil of said brushless motor for generating signals representing the rotational speed of said brushless motor.

8. A rotary cylinder apparatus according to claim 7, wherein said detecting coil of said rotational speed detecting means is laminated with said driving coil of said brushless motor so as to be disposed in a cross relationship with the magnetic flux of said permanent magnet rotor.

9. A rotary cylinder apparatus according to claim 7, further including a printed circuit board mounted on said stator yoke facing said permanent magnet rotor, and wherein said detecting coil of said rotational speed detecting means is mounted on said printed circuit board and said driving coil of said brushless motor is mounted on said detecting coil.

10. A rotary cylinder apparatus according to claim 7, further including position detecting means mounted adjacent said driving coil of said brushless motor for detecting the position of said permanent magnet rotor for use in control of the current supplied to said driving coil.

11. A rotary cylinder apparatus according to claim 10, wherein said position detecting means includes a magnetosensitive element for detecting leakage flux from said permanent magnet rotor.

12. A rotary cylinder apparatus according to claims 10 or 11, further including a printed circuit board mounted on said stator yoke facing said permanent magnet rotor, said detecting coil of said rotational speed detecting means and said position detecting means being mounted on said printed circuit board.

13. A rotary cylinder apparatus according to claims 7 or 8, wherein said detecting coil is disposed coaxially with respect to said driving coil.

* * * * *